(12) United States Patent
Koulouh et al.

(10) Patent No.: US 11,487,052 B2
(45) Date of Patent: Nov. 1, 2022

(54) OPTICAL ELEMENT FOR MODIFYING THE DISTRIBUTION OF A LIGHT BEAM, FOR A MOTOR VEHICLE HEADLIGHT

(71) Applicant: AML Systems, Paris (FR)

(72) Inventors: Hassan Koulouh, Lamorlaye (FR); Anderson Noronha, Fontenay Sous Bois (FR)

(73) Assignee: AML SYSTEMS, Paris (FR)

( * ) Notice: Subject to any disclaimer, the term of this patent is extended or adjusted under 35 U.S.C. 154(b) by 0 days.

(21) Appl. No.: 17/258,044

(22) PCT Filed: Jul. 5, 2019

(86) PCT No.: PCT/FR2019/051668
§ 371 (c)(1),
(2) Date: Jan. 5, 2021

(87) PCT Pub. No.: WO2020/008154
PCT Pub. Date: Jan. 9, 2020

(65) Prior Publication Data
US 2021/0285615 A1    Sep. 16, 2021

(30) Foreign Application Priority Data
Jul. 6, 2018 (FR) ...................................... 1856230

(51) Int. Cl.
| F21S 41/37 | (2018.01) |
| F21V 7/28 | (2018.01) |
| C25D 7/08 | (2006.01) |
| C25D 5/14 | (2006.01) |
| F21S 41/675 | (2018.01) |
| G02B 5/08 | (2006.01) |
| C25D 5/00 | (2006.01) |

(52) U.S. Cl.
CPC ............. *G02B 5/0875* (2013.01); *C25D 5/14* (2013.01); *C25D 5/627* (2020.08); *C25D 7/08* (2013.01); *F21S 41/37* (2018.01); *F21S 41/675* (2018.01); *F21V 7/28* (2018.02)

(58) Field of Classification Search
CPC ........... F21S 41/37; F21S 41/675; F21V 7/28; C25D 7/08; C25D 5/14; C25D 5/0875; C25D 5/627; G02B 5/0875
See application file for complete search history.

(56) References Cited

U.S. PATENT DOCUMENTS

| 2012/0052319 A1 | 3/2012 | Sugawara et al. | |
| 2012/0300485 A1* | 11/2012 | Lee ...................... | F21S 41/148 |
| | | | 362/514 |
| 2017/0159183 A1* | 6/2017 | Nagamine .................. | C08J 7/12 |

FOREIGN PATENT DOCUMENTS

| FR | 3028002 A1 * | 5/2016 | ............ F21S 41/675 |
| KR | 20180069240  * | 6/2018 | ............ F21S 41/675 |

OTHER PUBLICATIONS

English Translation of International Search Report from corresponding PCT/FR2019/051668 dated Sep. 11, 2019.

* cited by examiner

*Primary Examiner* — Thomas M Sember
(74) *Attorney, Agent, or Firm* — Aird & McBurney LP

(57) ABSTRACT

The invention relates to an optical element including a resin body having a functional surface covered with a reflective coating capable of reflecting light beams, the reflective coating including a copper layer covering at least the functional surface, a nickel layer covering the copper layer, and a chromium layer covering the nickel layer.

12 Claims, 2 Drawing Sheets

OPTICAL ELEMENT FOR MODIFYING THE DISTRIBUTION OF A LIGHT BEAM, FOR A MOTOR VEHICLE HEADLIGHT

CROSS REFERENCE TO RELATED APPLICATIONS

This non-provisional patent application is continuation application of PCT Application No. PCT/FR2019/051668, filed with the French Patent Office on 5 Jul. 2019, which claims priority to French Patent Application No. 1856230, filed on 6 Jul. 2018, all of which are incorporated herein by reference in their entirety.

TECHNICAL FIELD

The present invention relates to the field of equipment for motor vehicles and, more particularly, of headlights for these motor vehicles.

BACKGROUND

Motor vehicle headlights generally include an elliptical reflector in which are arranged a light source, a cut-off bar that allows various phases of concealment of the light beam, and an optical lens that diffuses the light beam created on the road.

The cut-off bar is electrically actuated by an actuator in order to move, on command, between at least two angular positions in which it obscures the light beam to a greater or lesser extent. This makes it possible to limit the range of the headlight, for example to that of dipped-beam headlights, known as the low beam position, so as not to dazzle drivers traveling in the opposite direction, or to that of the main beam headlights, the so-called high beam position, in which there is no screening. This technology is commonly used with headlights including a high-power light source, such as halogen or xenon headlights, for which the loss of luminous intensity due to the interception of the flux by the bar is not really detrimental.

Automotive headlight technology currently tends to use light sources consisting of light-emitting diodes known as LEDs ("Light-Emitting Diodes") due to their reduced cost and longer service life. On the other hand, the luminous intensity emitted by these devices still remains limited for the moment, and it is necessary to utilize it to the maximum. It is therefore desirable to be able to dispense with the screen member—which, in the low beam position, absorbs substantially half of the emitted luminous flux.

Document FR 3 028 002 proposes the use of a mobile reflective surface. Thanks to its mobility, this reflective surface makes it possible to redirect the light beam to form high beams or low beams as desired without any screening and hence without losing a portion of the output of the light beam emitted.

However, this reflective surface is exposed to external radiation, particularly solar radiation. It can therefore heat up as a result of a focusing of the external radiation on said reflective surface. This reflective surface may be carried by a plastic support, which can therefore be damaged by heating at the level of the reflective surface.

DISCLOSURE OF THE INVENTION

It is the object of the present invention to alleviate these drawbacks by providing a heat-resistant optical element.

To this end, the invention relates to an optical element intended to modify a distribution of light beams for a motor vehicle headlight.

According to the invention, the optical element includes a resin body having a functional surface covered with a reflective coating that is capable of reflecting the light beams, the reflective coating including:
  a copper layer covering at least the functional surface,
  a nickel layer covering the copper layer,
  a chromium layer covering the nickel layer.

Thus, heating occurring on the functional surface can be dissipated by virtue of the copper layer. The copper layer is for heat dissipation to enable the structural integrity and aging effect on the optical element. The resin body is molded with resin as the functional surface dimension can be easily replicated by plastic injection molding. It is easily made into a specific geometry compared to metal injection molding if a specific geometry design is needed.

According to one embodiment, the optical element further includes a nickel plating layer between the functional surface and the copper layer. A nickel plating layer can be plated on the resin body directly, because the body is a resin body.

According to one variant, the optical element includes a plating layer including a mixture of nickel and copper between the functional surface and the copper layer. The plating layer including a mixture of nickel and copper can be plated on the resin body directly, because the body is a resin body.

The plating layer allows for good adhesion of the reflective coating to the resin body.

According to another embodiment, the nickel layer includes:
  a semi-bright nickel underlayer covering the copper layer,
  a high-sulfur nickel underlayer covering the semi-bright nickel underlayer,
  a bright nickel underlayer covering the high-sulfur nickel underlayer,
  a matte nickel underlayer covering the bright nickel underlayer.

The nickel layer including four different kinds of Ni-based layer with different texture and composition specification. This multi-layer nickel plating tackles the stringent demand of corrosion resistance, mechanical protection, thermal cycling stress and adhesion for the multilayer reflecting layer function and reliability.

According to a first embodiment, the functional surface has a semi-elliptical shape.

According to a second embodiment, the functional surface has a planar shape.

The invention also relates to a headlight for a motor vehicle including at least one reflector and at least one light source that is capable of emitting at least one light beam, the reflector having the shape of a portion of a half-ellipsoid extending above a plane of symmetry of the ellipsoid, the light source being positioned on an axis of symmetry of the ellipsoid.

According to the invention, the headlight further includes an optical element as described above, the optical element being designed to be movable in order to modify a distribution of the light beam emitted by the light source and reflected by the reflector.

Moreover, the light source is disposed substantially at a first focal point of the ellipsoid, the reflector being able to reflect the light beam or beams toward a second focal point of the ellipsoid, the functional surface of the optical element being disposed at the second focal point. The optical element is positioned at the second focal point of the ellipsoid that maximized the light received from the reflector when the light source is placed at the first focal point of the ellipsoid.

Furthermore, the headlight includes a drive module that is configured to change the position of the optical element between at least a first position of the optical element and a second position of the optical element, with the first position of the optical element making it possible to form a beam in the form of dipped beams at the output of the headlight and the second position of the optical element making it possible to form a beam in the form of high beams at the output of the headlight.

The invention also relates to a method for manufacturing an optical element that is intended to modify a distribution of light beams as described above.

According to the invention, the method includes the following steps:
- a step of forming a resin body having a functional surface;
- a first step of covering at least a portion of the functional surface with a copper layer;
- a second step of covering the copper layer with a nickel layer;
- a third step of covering the nickel layer with a chromium layer.

According to one embodiment, the method further includes a step of applying a nickel plating preceding the first covering step. A nickel plating layer can be plated on the resin body directly, because the body is a resin body.

According to a variant, the method further includes a step of covering with a plating including a mixture of nickel and copper preceding the first covering step. The plating layer including a mixture of nickel and copper can be plated on the resin body directly, because the body is a resin body.

According to another embodiment, the second covering step includes:
- a first sub-step of applying a semi-bright nickel underlayer to the copper layer;
- a second sub-step of applying a high-sulfur nickel underlayer to the semi-bright nickel underlayer;
- a third sub-step of applying a bright nickel underlayer to the high-sulfur nickel underlayer;
- a fourth sub-step of applying a matte nickel underlayer to the bright nickel underlayer.

The nickel layer including four different kinds of Ni-based layer with different texture and composition specification. This multi-layer nickel plating tackles the stringent demand of corrosion resistance, mechanical protection, thermal cycling stress and adhesion for the multilayer reflecting layer function and reliability.

BRIEF DESCRIPTION OF THE FIGURES

The invention, with its features and advantages, will emerge more clearly on reading the description with reference to the appended drawings, in which.

DETAILED DESCRIPTION

Figure 1:
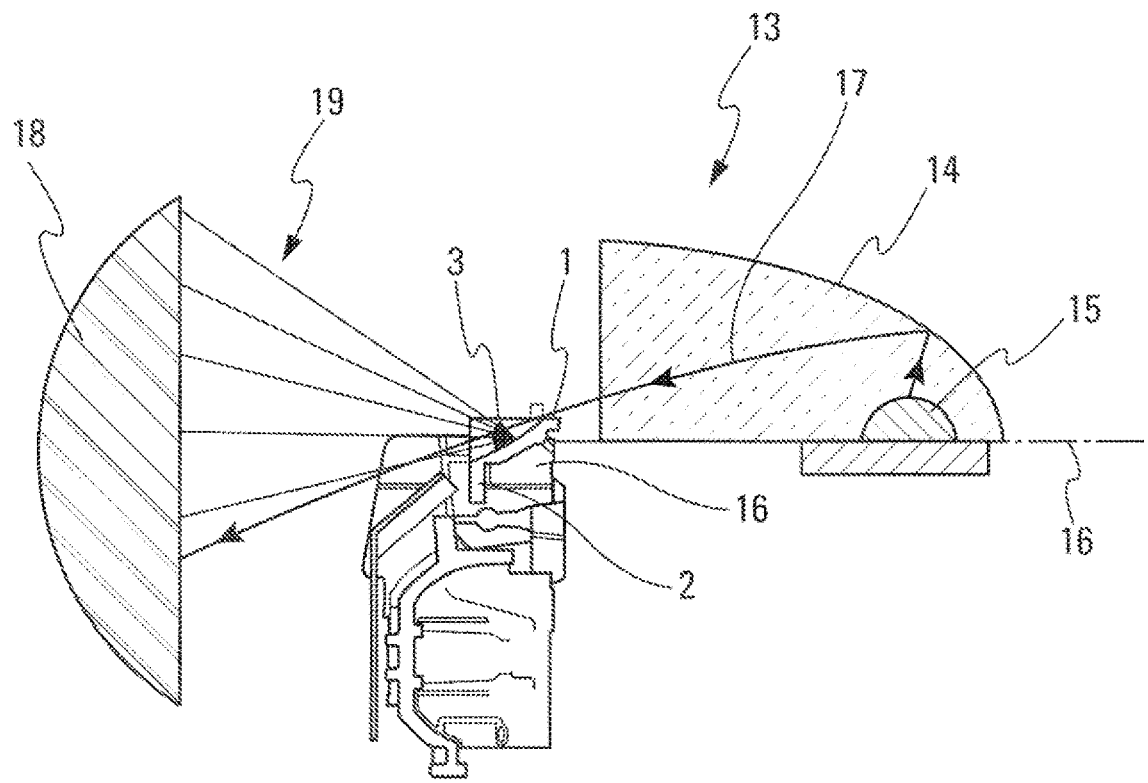
FIG. 1 is a profile view of the headlight for a motor vehicle according to one embodiment.

FIG. 1 shows a headlight 13 for a motor vehicle.

The headlight includes at least one reflector 14 and at least one light source 15 that is capable of emitting at least one light beam 17.

In the description that follows, the term "light beam" will be used in the singular. However, it will be understood that this term can also mean "light beams" in the plural.

The reflector 14 has the shape of a portion of a semi-ellipsoid extending above a plane of symmetry 16 of the ellipsoid. The light source 15 is positioned on an axis of symmetry of the ellipsoid. The light source can include at least one LED diode which emits at a solid angle of $2\pi$ steradians so that all of the light beam emitted by the light source is reflected by the reflector.

The headlight 13 further includes a movable optical element 1 for modifying a distribution of the light beam 17 emitted by the light source 15 and reflected by the reflector 14.

Advantageously, the light source 15 is disposed substantially at a first focal point of the ellipsoid. The reflector 14 is then able to reflect the light beam 17 toward a second focal point of the ellipsoid.

The headlight can also include a lens 18 which is arranged in the path of the light beam 17 after said light beam 17 has been reflected on the reflector 14 then screened and/or reflected by the optical element 1. The lens 18 is prefesably convergent.

Advantageously, the headlight 13 includes a drive module 26 that is configured to modify the position of the optical element 1 between at least a first position of the optical element 1 and a second position of the optical element 1. The first position of the optical element 1 makes it possible to form a beam in the form of low beam lights at the output of the headlight 13. The second position of the optical element 1 makes it possible to form a beam in the form of high beam lights at the output of the headlight 13.

Figure 2:
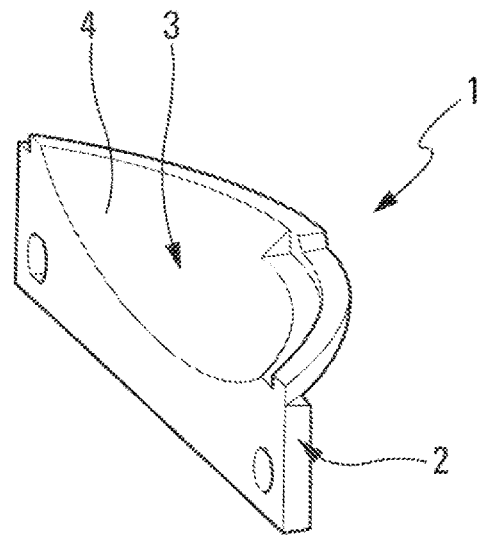
FIG. 2 is a perspective view of the optical element according to one embodiment.

The optical element 1 that is intended to modify a distribution of light beams is shown in FIG. 2.

The optical element 1 includes a resin body 2 having a functional surface 3 covered with a reflective coating 4 that is capable of reflecting the light beams. The resin body 2 is molded with resin as the functional surface dimension can be easily replicated by plastic injection molding. It is easily made into a specific geometry compared to metal injection molding if a specific geometry design is needed. In a non-limiting manner, the resin can be polyphthalamide (PPA) reinforced with glass fibers (PPA GF25-40%). This resin has excellent thermal properties and high mechanical strength. It is also resistant to fatigue.

Preferably, the resin can be reinforced PPA (PPA MR 30%). This resin has excellent thermal properties, good mechanical strength, and very good dimensional stability. PPA MR 30% is preferred for its dimensional stability. After all, the successive coatings tend to amplify any defects in appearance.

Advantageously, the functional surface 3 of the optical element 1 is disposed substantially at the second focal point of the ellipsoid. The optical element 1 is positioned at the second focal point of the ellipsoid that maximized the light received from the reflector 14 when the light source is placed at the first focal point of the ellipsoid.

The functional surface 3 can have a semi-elliptical shape or a planar shape.

The semi-elliptical shape of the functional surface 3 may correspond to a concave semi-elliptical shape located outside the focal plane of the ellipsoid, between the lens 18 and the focal plane, allowing reflection of the light source 15 to achieve additional, subdued light distribution above the dipped beam in order to increase the visibility of vertical traffic signs.

Figure 3:
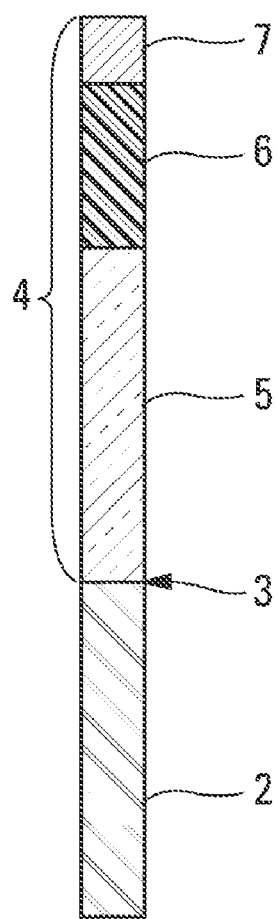
FIG. 3 shows a cross section of the reflective coating on the body according to one embodiment.

The reflective coating 4 includes (FIG. 3):
a copper layer 5 covering the functional surface 3 at least in part,
a nickel layer 6 covering the copper layer 5, and
a chromium layer 7 covering the nickel layer 6.

The copper layer 5 corresponds to a heat-conductive layer. Said copper layer 5 dissipates the heat produced by the external radiation 19 on the functional surface 3. It also has good resistance to high temperatures and temperature changes. Copper exhibits good adhesion with the material of the resin body 2 and the nickel layer 6. The copper layer 5 also imparts good elasticity to the reflective coating 4.

If the headlight 13 includes a converging lens 18, heating of the functional surface 3 caused by the convergence of the external radiation 19 on said functional surface 3 can be dissipated by the copper layer 5. Heating is therefore not localized where the external radiation 19 converges. This prevents the destruction of the resin body 2.

In a non-limiting manner, the copper layer 5 has a thickness of between 15 µm and 25 µm, preferably 20 µm.

The nickel layer 6 makes it possible to resist the corrosion of the reflective coating 4. It also exhibits good resistance to climatic cycles.

The chromium layer 7 makes it possible to impart hardness to the reflective coating 4 as well as brightness.

In a non-limiting manner, the chromium layer has a thickness of between 0.1 µm and 1 µm, preferably 0.25 µm.

According to one embodiment, the reflective coating further includes a plating layer 8 between the functional surface 3 and the copper layer 5.

The plating layer 8 can be made of nickel or include a mixture of nickel and copper.

In a non-limiting manner, the plating layer includes from 50% to 70% copper and from 30% to 50% nickel. Preferably, the plating layer includes about 60% copper and 40% nickel.

The plating layer 8 improves the adhesion of the copper layer 5 to the resin body 2.

In a non-limiting manner, the plating layer has a thickness of between 0.5 µm and 1.5 µm, preferably 1 µm.

Figure 4:
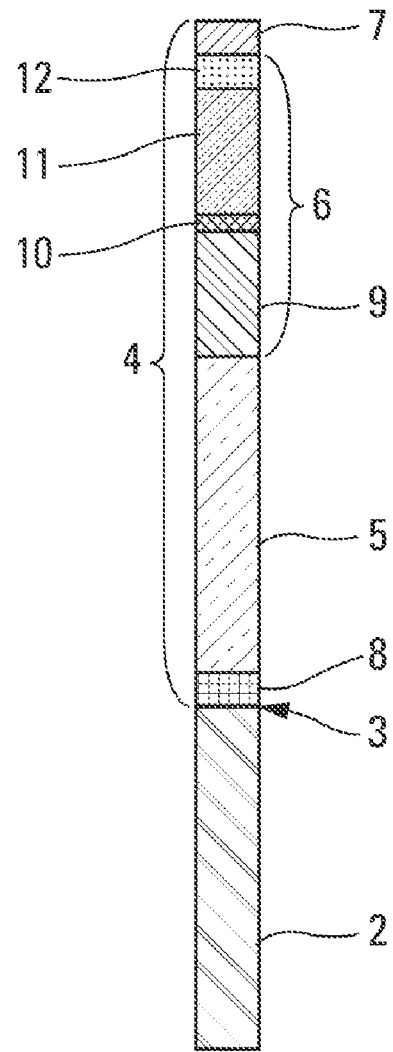
FIG. 4 shows a cross section of the reflective coating on the body according to another embodiment.

According to another embodiment (FIG. 4), the nickel layer 6 includes:
a semi-bright nickel underlayer 9 covering the copper layer 5,
a high-sulfur nickel underlayer 10 covering the semi-bright nickel underlayer 9,
a bright nickel underlayer 11 covering the high-sulfur nickel underlayer 10,
a matte nickel underlayer 12 covering the bright nickel underlayer 11.

The semi-bright nickel underlayer 9 provides good mutual adhesion of the copper layer 5 and the nickel layer 6. It also imparts good corrosion resistance to the reflective coating 4.

In a non-limiting manner, the semi-bright nickel underlayer 9 has a low sulfur content of between 0.002% and 0.005% by mass.

In a non-limiting manner, the semi-bright nickel underlayer 9 has a thickness of between 10 µm and 20 µm, preferably 15 µm.

The high-sulfur nickel underlayer 10 allows good adhesion of the semi-bright nickel underlayer 9 and the bright nickel underlayer 11.

In a non-limiting manner, the high-sulfur nickel underlayer 10 has a sulfur content of between 0.1% and 0.25% by mass. The term "high-sulfur nickel" means that the nickel includes a sulfur content ranging from 0.1% to 0.25% by mass.

In a non-limiting manner, the high-sulfur nickel underlayer 10 has a thickness of between 1.5 µm and 2.5 µm.

The bright nickel underlayer 11 imparts a good shine to the reflective coating 4 and improves the hardness of the reflective coating 4.

In a non-limiting manner, the bright nickel underlayer 11 has a thickness of between 5 µm and 15 µm, preferably 10 µm.

The matte nickel underlayer 12 imparts to the reflective coating 4 a shiny surface that is identical to a mirror.

In a non-limiting manner, the matte nickel underlayer 12 has a thickness of between 5 µm and 15 µm, preferably 10 µm.

The terms "semi-bright," "bright," and "matte" can be interlinked by a relationship between diffuse reflection and specular reflection (reflectivity). A reflection can be said to be diffuse if an incident ray is reflected in a large number of directions, while a reflection is said to be specular when an incident ray is reflected in one direction.

Thus, the term "matte" can mean that diffuse reflection is greater than the specular reflection. The luminous energy reflected by scattering is therefore greater than the luminous energy reflected specularly.

The term "bright" can mean that specular reflection is greater than the diffuse reflection. The specularly reflected luminous energy is therefore greater than the luminous energy reflected by diffusion.

The term "semi-bright" derives from these definitions. It can therefore mean that the specular reflection is roughly as great as or appreciably less than the diffuse reflection. The specularly reflected luminous energy is therefore substantially equal to or appreciably less than the luminous energy reflected by diffusion.

In a non-limiting manner, a bright surface has a reflectivity (specular reflection) of between 50% and 100%, a semi-bright surface of between 20% and 50%, and a matte surface of less than 20%.

The optical element 1 can be manufactured by means of a manufacturing process that includes the following steps:
a step of forming a resin body 2 having a functional surface 3;
a first step of covering at least a portion of the functional surface 3 with a copper layer 5;
a second step of covering the copper layer 5 with a nickel layer 6;
a third step of covering the nickel layer 6 with a chromium layer 7.

The step of forming the resin body 2 can be carried out by molding the resin or by 3D printing.

The first covering step can be carried out by chemical copper plating.

The second covering step can be carried out by electrolytic deposition.

The third covering step can be carried out by electrolytic deposition.

According to one embodiment, the method further includes a step of applying a plating 8 of nickel or of a mixture of nickel and copper preceding the first covering step.

The step of applying a plating 8 can be carried out by electrolytic deposition.

According to another embodiment, the second covering step includes:
a first sub-step of applying a semi-bright nickel underlayer 9 to the copper layer 5;
a second sub-step of applying a high-sulfur nickel underlayer 10 to the semi-bright nickel underlayer 9;
a third sub-step of applying a bright nickel underlayer 11 to the high-sulfur nickel underlayer 10;
a fourth sub-step of applying a matte nickel underlayer 12 to the bright nickel underlayer 11;
Each of the sub-steps can be implemented by electrolytic deposition.

The first covering sub-step can include the deposition of a matte nickel layer and polishing the matte nickel layer.

The third covering sub-step can include the deposition of a matte nickel layer and dipping the matte nickel layer in a bath containing brightening additives.

The present description details various embodiments with reference to figures and/or technical features. Those skilled in the art will understand that the various technical features of the various embodiments can be combined with one another in order to obtain other embodiments unless explicitly stated otherwise or unless these technical features are incompatible.

The invention claimed is:

1. A movable optical element that is intended to modify a distribution of light beams for a motor vehicle headlight, wherein the movable optical element comprises a resin body having a functional surface covered with a reflective coating capable of reflecting the light beams, the resin body is molded with resin, and the reflective coating comprising:
a copper layer covering the functional surface at least in part,
a nickel layer covering the copper layer, and
a chromium layer covering the nickel layer;
and the nickel layer comprises:
a semi-bright nickel underlayer covering the copper layer,
a high-sulfur nickel underlayer covering the semi-bright nickel underlayer,
a bright nickel underlayer covering the high-sulfur nickel underlayer,
a matte nickel underlayer covering the bright nickel underlayer.

2. The movable optical element according to claim 1, wherein the movable optical element further comprises a nickel plating layer between the functional surface and the copper layer.

3. The movable optical element according to claim 1, wherein the movable optical element further comprises a plating layer comprising a mixture of nickel and copper between the functional surface and the copper layer.

4. The movable optical element according to claim 1, wherein the functional surface has a semi-elliptical shape.

5. The movable optical element according to claim 1, wherein the functional surface has a planar shape.

6. A headlight for a motor vehicle, comprising at least one reflector and at least one light source that is capable of emitting at least one light beam, the reflector having the shape of a portion of a semi-ellipsoid extending above a plane of symmetry of the ellipsoid, and the light source being positioned on an axis of symmetry of the ellipsoid, the headlight further comprises a movable optical element, and the movable optical element that is intended to modify a distribution of light beams for a motor vehicle headlight, wherein the movable optical element comprises a resin body having a functional surface covered with a reflective coating capable of reflecting the light beams, the resin body is molded with resin, and the reflective coating comprising: a copper layer covering the functional surface at least in part, a nickel layer covering the copper layer, and a chromium layer covering the nickel layer; the movable optical element being designed to be movable in order to modify a distribution of the light beam emitted by the light source and reflected by the reflector.

7. The headlight according to claim 6, wherein the light source is disposed substantially at a first focal point of the ellipsoid, the reflector being able to reflect the light beam or beams toward a second focal point of the ellipsoid, the functional surface of the movable optical element being disposed at the second focal point.

8. The headlight according to claim 6, wherein the headlight comprises a drive module that is configured to change the position of the movable optical element between at least a first position of the movable optical element and a second position of the movable optical element, with the first position of the movable optical element making it possible to form a beam in the form of low beams at the output of the headlight and the second position of the movable optical element making it possible to form a beam in the form of high beams at the output of the headlight.

9. A method for manufacturing a movable optical element that is intended to modify a distribution of light beams, wherein the movable optical element comprises a resin body having a functional surface covered with a reflective coating capable of reflecting the light beams, and the resin body is molded with resin, and the reflective coating comprising: a copper layer covering the functional surface at least in part, a nickel layer covering the copper layer, and a chromium layer covering the nickel layer; wherein the method comprises the following steps:
a step of forming a resin body having a functional surface;
a first step of covering at least a portion of the functional surface with a copper layer;
a second step of covering the copper layer with a nickel layer;
a third step of covering the nickel layer with a chromium layer.

10. The method according to claim 9, wherein the method further comprises a step of applying a nickel plating preceding the first covering step.

11. The method according to claim 9, wherein the method comprises a step of covering with a plating comprising a mixture of nickel and copper preceding the first covering step.

12. The method according to claim 9, wherein the second-step comprises:
a first sub-step of applying a semi-bright nickel underlayer to the copper layer,
a second sub-step of applying a high-sulfur nickel underlayer to the semi-bright nickel underlayer,
a third sub-step of applying a bright nickel underlayer on the high-sulfur nickel underlayer, and a fourth sub-step of applying a matte nickel sub-layer to the bright nickel underlayer.

* * * * *